(12) United States Patent
Chiang et al.

(10) Patent No.: US 7,050,679 B2
(45) Date of Patent: May 23, 2006

(54) OPTICALLY INTEGRATED DEVICE

(75) Inventors: Po-Liang Chiang, Taipei (TW); Hsin-Wen Tsai, Teipei (TW)

(73) Assignee: United Microelectronics Corp., Hsin-Chu (TW)

( * ) Notice: Subject to any disclaimer, the term of this patent is extended or adjusted under 35 U.S.C. 154(b) by 151 days.

(21) Appl. No.: 10/653,163

(22) Filed: Sep. 3, 2003

(65) Prior Publication Data

US 2005/0047746 A1   Mar. 3, 2005

(51) Int. Cl.
  *G02B 6/00*   (2006.01)
(52) U.S. Cl. .......................................... 385/39; 359/651
(58) Field of Classification Search ............ 385/14–16, 385/24, 31, 39, 50, 88, 129, 146, 147; 359/651, 359/739; 353/20, 31, 102, 69, 103
See application file for complete search history.

(56) References Cited

U.S. PATENT DOCUMENTS 5,634,704 A * 6/1997 Shikama et al. ............ 353/31
5,802,222 A * 9/1998 Rasch et al. ................. 385/1
6,729,730 B1 * 5/2004 Ito .............................. 353/20
6,739,723 B1 * 5/2004 Haven et al. ............... 353/20
2002/0036833 A1 * 3/2002 Miyata et al. .............. 359/651
2004/0239889 A1 * 12/2004 Inamoto ...................... 353/69

FOREIGN PATENT DOCUMENTS

NL           8602406       * 4/1987 ............... 386/146

* cited by examiner

*Primary Examiner*—Akm Enayet Ullah
(74) *Attorney, Agent, or Firm*—Nath & Associates PLLC; Harold L. Novick

(57) ABSTRACT

The present invention relates to an optically integrated device, and more particularly, to an optically integrated device with low light loss. The optically integrated device includes an optical condenser to condense the light before the light enters an optical integrator. A color filter is attached on the optical integrator to filter through a portion of the light, and reflect the other portion of the light into the optical integrator. The optically integrated device recycles the reflected light inside the optical integrator to prevent the light loss.

17 Claims, 4 Drawing Sheets

OPTICALLY INTEGRATED DEVICE

CROSS REFERENCE TO RELATED APPLICATION

This invention is related to co-pending U.S. Patent application entitled "OPTICALLY INTEGRATED DEVICE" assigned to the same assignee as the present application and incorporated herein by reference in its entirety.

BACKGROUND OF THE INVENTION

1. Field of the Invention

The present invention relates to an optically integrated device, and more particularly, to an optically integrated device with a high luminous efficiency.

2. Description of the Prior Art

The optical system is improved as fast as the science develops. The know how of enhancing the luminous efficiency and using low power consumption while remain at the same volume of the optical system is very important. For example, the DLP (Digital Light Processing) image-processing system has the advantages of a high luminous efficiency and a small volume.

As shown in FIG. 1, the optical integrator 3 of the DLP image-processing system is a pillar with four side surfaces and two end surfaces. There is a rectangular light inputting face 5 on an end surface, and the other end surface is a light outputting face 9. A reflective part 7 is distributed over the side surfaces. When the light L is emitted from the light source 1, a portion of the light L may penetrate through the optical integrator 3 directly to be filtered through a color wheel 11. The other portion of the light L that does not penetrate the optical integrator 3 directly is reflected by the reflective part 27 to penetrate the light outputting face 9, and to be filtered through the color wheel 11.

The rectangular light inputting face 5 adjusts the shape of the light L for projecting a rectangular image. If the shape of the cross-section of the light source 1 is circular, some portion of the light L, as the light L', is lost. Thus the luminous efficiency of the optical integrator is limited due to the lost light L'.

Furthermore, if the design of the light source 1 is not perfect, some portion of the light L may be lost.

Moreover, some portion of the light L may be lost due to the color filter 11. As shown in FIG. 1, the light L is filtered through the color filter 11 to become the light $L_0$, and is reflected by the color filter 11 to become the light $L_0'$. The color of the light $L_0$ and the area of the color wheel 11 that filtered the light $L_0$ through is the same. Neither the reflected light $L_0'$ and a little portion of the light L that is absorbed by the optical integrator 3 and the color wheel 11 are lost. Because the color wheel 11 includes multiple colors, the reflected, the multiple colors and the lost light $L_0'$ is lost to limit the luminous efficiency of the image-processing device.

An improved DLP image-processing device includes multiple DMDs (Digital Micromirror Devices) to enhance the luminous efficiency. The light L is separated to be the primary colors including the Red light, the Green light and the Blue light by a plurality of prisms due to the different refractive indexes of the different primary colors. The image-processing device includes multiple DMDs enhances the luminous efficiency, because most primary colors are projected on the DMDs to form the image. However, the DLP image-processing device including multiple DMDs enhances the luminous efficiency, the volume and the cost of the production at the same time.

According to the above description, it is necessary to develop an image-processing device with the higher luminous efficiency, the smaller volume and a more economical cost.

SUMMARY OF THE INVENTION

According to the above description of the background of the invention, it is one objective of the present invention to provide an optically integrated device including a light condenser between a light source and an optical integrator. The light condenser collects the light for enhancing the luminous efficiency of the optically integrated device without more power consumption and to prevent light loss.

It is an another objective of the present invention to provide an image-processing device with a high luminous efficiency by redesigning the relationship between the optical integrator and the color filter without increasing the volume of the image-processing device.

It is a further objective of the present invention to provide the optically integrated device that recycles the reflected light by redesigning the relationship between the optical integrator and the color filter to enhance the luminous efficiency without increasing an unnecessary element. The color filter filters through and reflects the light at the same time.

It is a further objective of the present invention to provide an image-processing device with the high luminous efficiency by collecting the light to economize the cost of the production that enhances the luminous efficiency in the prior art.

The present invention provides an optically integrated device with low light loss by setting an optical condenser to condense the light before the light enters an optical integrator. Simultaneously, a color filter is attached or formed on the optical integrator to filter through a portion of the light, and reflect the other portion of the light into the optical integrator. The optically integrated device recycles the reflected light inside the optical integrator to prevent the light loss and to enhance the luminous efficiency.

All these advantageous features as well as others that are obvious from the following detailed description of preferred embodiments of the invention are obtained.

DESCRIPTION OF THE PREFERRED EMBODIMENT

In the present disclosure, the words "a" or "an" are to be taken to include both the singular and the plural. Conversely, any reference to plural items shall, where appropriate, include the singular.

The preferred embodiment of the present invention provides an optically integrated device to improve the disadvantages in the prior art. Nonetheless, it should be recognized that the present invention can be practiced in a wide range of other embodiments besides those explicitly described, and the scope of the present invention is expressly not limited except as specified in the accompanying claims.

The invention enhances the luminous efficiency of an optically integrated device by setting an optical condenser between an optical integrator and a light source to collect the light emitted from the light source. Furthermore, varying the relative position between a color filter and the optical integrator to recycle the light that is reflected from the color filter for enhancing the luminous efficiency.

Figure 1:
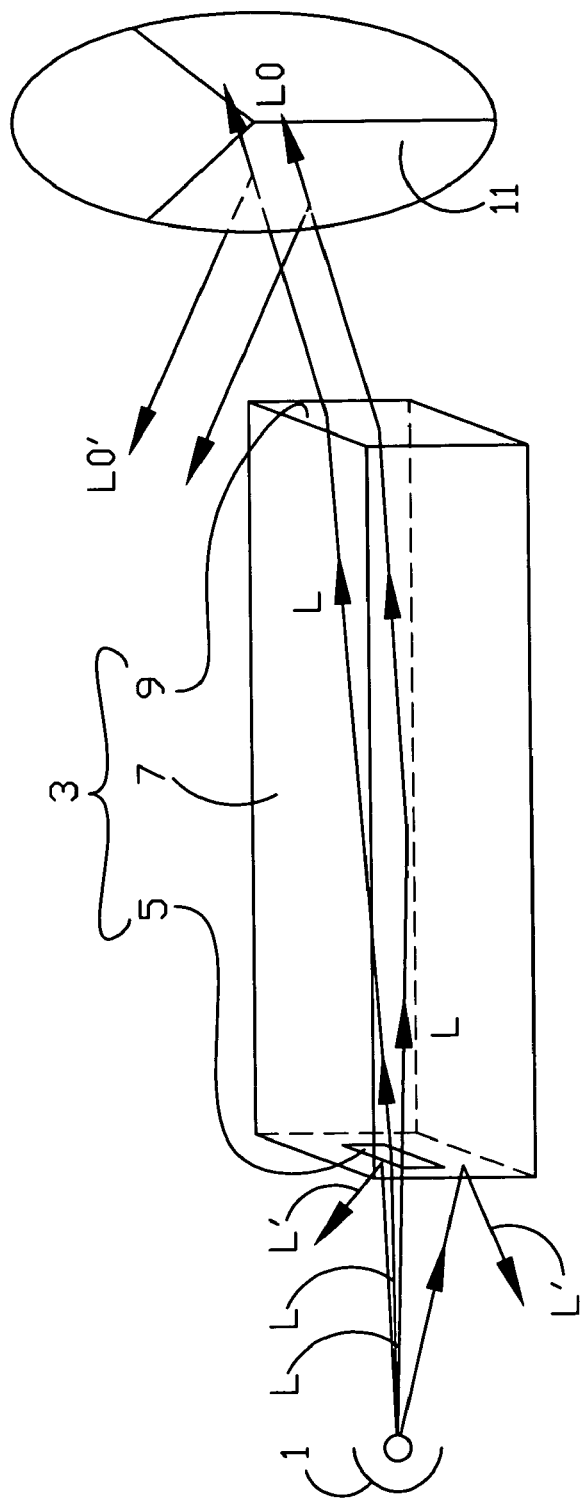
FIG. 1 is a three-dimensional perspective view of an image-processing device in the prior art.
Figure 2:
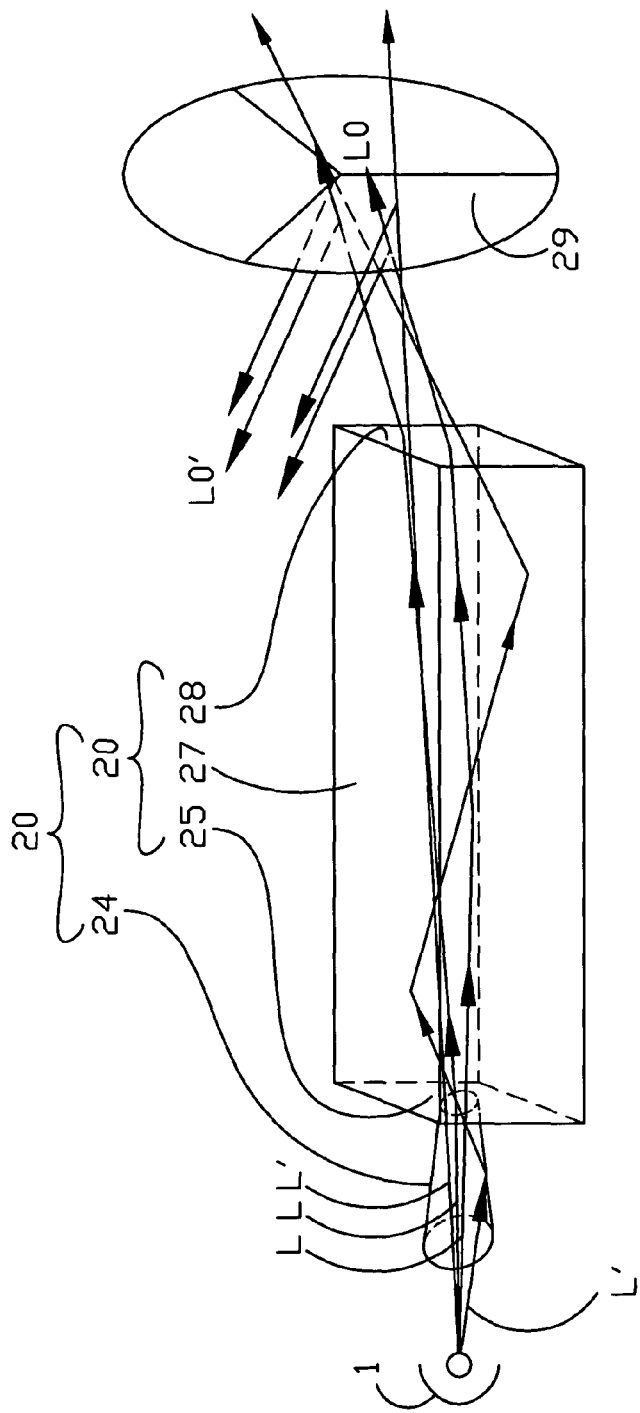
FIG. 2 is a three-dimensional perspective view of the first embodiment of the present invention.

A three-dimensional perspective view of the first embodiment is showed in FIG. 2. An optically integrated device 20 includes an optical integrator 23 and an optical condenser 24. The optical integrator 23 is a pillar with four side surfaces and two end surfaces. One end surface is a light inputting face 25, and the other end surface is a light outputting face 28. A reflective part 27 distributes over the side surfaces. The light L emitted from a light source 21 is collected by the optical condenser 24 to enter the optical integrator 23 through the light inputting face 25. When the light L is emitted inside the optical integrator 23, a portion of the light L may penetrate through the optical integrator 23 directly to be filtered through a color wheel 29. The other portion of the light L that does not penetrate the optical integrator 23 directly is reflected by the reflective part 27 to penetrate the light outputting face 28, and to be filtered through the color wheel 29.

In the prior art, a portion of the light L' may be lost because the rectangular light inputting face 5. The optical condenser 24 collects the light L' to prevent the loss from light L', and enhances the luminous efficiency of the optically integrated device 20.

Simultaneously, the optical condenser 24 collects the deviated light L', which is emitted from the imperfect light source 1, to enhance the luminous efficiency of the optically integrated device 20.

Figure 3:
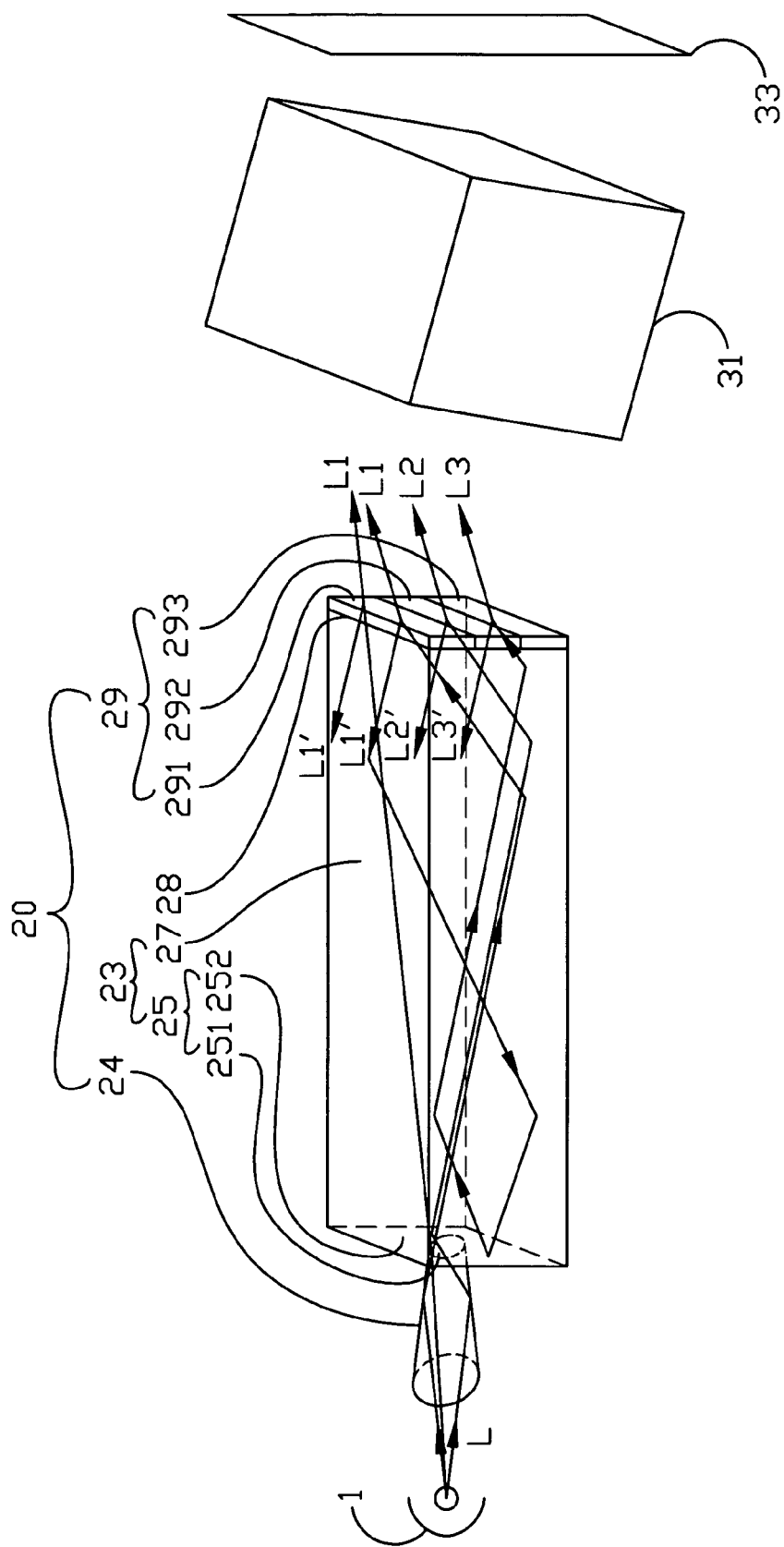
FIG. 3 is a three-dimensional perspective view of the second embodiment of the present invention.

A three-dimensional perspective view of the second embodiment is showed in FIG. 3. There is an optical condenser 24 between the light source 1 and the integrator 23. The optically integrated device 20 further includes a color filter 29, which replaces the color wheel 11, attached on the light outputting face 28. An image-processing device includes a light source 1, an optically integrated device 20 and an image-forming system that includes a scrolling prism 31 and an imaging face 33. The optically integrated device 20 is set between the light source 1 and the image-forming system.

The optically integrated device 20 includes the optical integrator 23, the optical condenser 24 and the color filter 29 that includes multiple colors. The optical integrator 23 includes a light inputting face 25, a light outputting face 28 and a reflective part 27. The color filter 29 is adhered onto the light outputting face 28, wherein the color filter 29 includes a color filter 291, a color filter 292 and a color filter 293. The reflecting part 27 is set between the light inputting face 25 and the light outputting face 28 to reflect the light entered inside the optical integrator 23. The reflective part 27 is distributed over the optical integrator 23 except for the light inputting face 25 and the light outputting face 28. The light inputting face 25 includes a translucent part 251 and a reflector 252. The light L enters the optical integrator 23 through the translucent part 251. The reflector 252 reflects the light L that includes the light $L_1'$, the light $L_1'$ and the light $L_1'$ which enters the optical integrator 23.

As shown in FIG. 3, the light source 1, which preferably is a point light source positioned near the light inputting face 25, which emits the light L that passes through the optical condenser 24, the translucent part 251, and the whole optical integrator 23, directly. The reflective part 27 reflects some portion of the light L that cannot directly pass through the whole optical integrator 23. The light L is filtered through the color filter 29. The light $L_1$ is filtered through the color filter 291. The light $L_2$ is filtered through the color filter 292. The light $L_3$ is filtered through the color filter 293. The scrolling prism 31 periodically rotates to project the light $L_1$, the light $L_2$ and $L_3$ on different portions of the imaging face 33. The light $L_1$ is projected on the higher portion of the imaging face 33, the light $L_2$ is projected on the middle portion of the imaging face 33, and the light $L_3$ is projected on the lower portion of the imaging face 33 before rotating the scrolling prism 31. When the scrolling prism 31 rotates, the light $L_1$ is projected on the middle portion of the imaging face 33, the light $L_2$ is projected on the lower portion of the imaging face 33, and the light $L_3$ is projected on the higher portion of the imaging face 33. If the scrolling prism 31 continuously rotates, the light $L_1$ is projected on the lower portion of the imaging face 33, the light $L_2$ is projected on the higher portion of the imaging face 33, and the light $L_3$ is projected on the middle portion of the imaging face 33. The light $L_1$ is continuously projected on the higher portion of the imaging face 33, the light $L_2$ is projected on the middle portion of the imaging face 33, and the light $L_3$ is projected on the lower portion of the imaging face 33 after rotating the scrolling prism 31. By the way, the scrolling prism 31 may be replaced with a different device that periodically projects the light $L_1$, the light $L_2$ and the light $L_3$ on different portions of the imaging face 33. The image-forming system may includes other elements to treat the light $L_1$, the light $L_2$ and the light $L_3$ for forming the image.

As shown in FIG. 3, the optical condenser 24 collects the light L emitted from the light source 1. So that the losing light L in the prior art is collected by the optical condenser 24 to enhance the luminous efficiency of the optically integrated device 20.

Some portion of the light L emitted from the light source 1 passes directly through the whole optical integrator 23 from the light inputting face 25 to the color filter 29,. The reflective part 27 reflects other portion of the light L that cannot pass directly through the optical integrator 23 to filter the light L through the color filter 29. When the light L is filtered through the color filter 29, some portion of the light L passes through the color filter 29, and some portion of the light L is reflected from the color filter 29 to stay inside the optical integrator 23. The light L that passes the color filter 29 and the color filter 29 are of the same color. The color of the light L that is reflected from the color filter 29 is different from the color of the color filter 29.

For example, the light L is filtered to be the light $L_1$ through the color filter 291, and is reflected to be the light $L_1'$ by the color filter 291. The image-forming system treats the filtered light, the light $L_1$, to be the image. The reflected light $L_1'$ is reflected by the reflective part 27 and the reflector 252 to be filtered through the color filter 292 and the color filter 293, which is filtered to be the light $L_2'$ and $L_3'$. Even though a little energy of the light is absorbed after every reflection and every filtration, the luminous efficiency of an optically integrated device 20 goes up quite substantially.

The color filter 29 may be a color selective panel or a plurality of the color selective panels adhered on the light outputting face 28. The color filter 29 may be formed by the dyeing method, pigment dispersed method, printing method, electrodepositing method and inkjet printing technology, or a composition of all the above. It is certainly to use an improved method or a new method to form the color filter 29.

As shown in FIG. 3, the optical condenser 24 is a solid taper rod. The optical integrator 23 is a solid hexahedron. The translucent part 251 has preferred a circular shape to receive the circular light L for increasing the probability of receiving light. Alternatively, the optical integrator 23 may be a hollow hexahedron. The light inputting face 25 may be a face with a hole. For example, the hole is the translucent part 251, and the reflector 252 is formed on the face. The light L enters the optical integrator 23 through the hole, as the translucent part 251. The reflector 252 that is formed on the face reflects the light L being inside the optical integrator 23.

Figure 4:
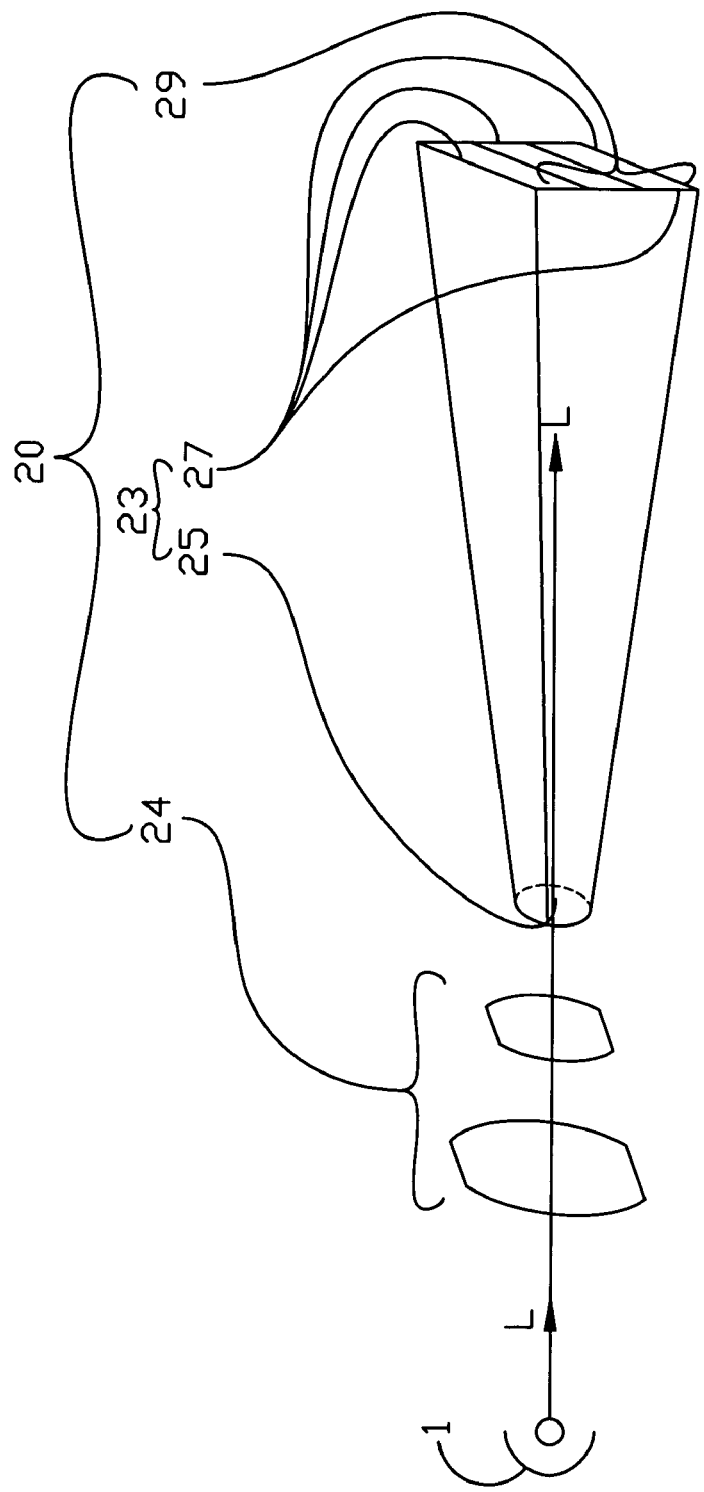
FIG. 4 is a three-dimensional perspective view of the third embodiment of the present invention.

The optical integrator 23 may be the different shape as shown in FIG. 4. The optical integrator 23 of the third embodiment of the present invention is a tapered cylinder. The shape of the optical integrator 23 may be different from all shapes of the preferred embodiments described above. The light condenser 24 that is set between the light source 1 and the optical integrator 23 may be replaced by a lens system 24 according to the different design, as shown in FIG. 4.

As shown in FIG. 4, the optical integrator 23 includes a light inputting face 25 and a reflective part 27 without a light inputting face. The optically integrated device 20 includes the optical integrator 23, that is a hollow hexahedron, and a color filter 29, that is fixed on the optical integrator 23. The color filter 29 may be a color selective panel, a spectroscope, or another device could filter through the color of the light.

The optically integrated device including a light condenser of the present invention collects and condenses the light before the light enters the optical integrator to prevent the light loss and to enhance the luminous efficiency of the optically integrated device. The color filter is attached onto the optical integrator to filter through a portion of the light, and to reflect the other portion of the light back to the optical integrator. The optically integrated device recycles the reflected light, which is reflected by the color filter, inside the optical integrator to prevent the light loss. Adhering, fixing or forming the color filter on the optical integrator of the present invention enhances the luminous efficiency without unnecessary elements that may increase the luminous efficiency, cost and volume of the production at the same time.

The above description only demonstrates and illustrates the preferred embodiments of the present invention, but does not limit the scope of the present invention to what described detailed herein; and any equivalent variations and modifications of the present invention should be within the scope of the claims hereafter.

What is claimed is:

1. An optically integrated device, comprising:
    an optical integrator comprising a pillar having a light inputting face at one end, a light outputting face at other end and a reflective part distributing over said pillar's side surface, said reflective part reflecting the light inside said optically integrated device and being positioned between said light inputting face and said light outputting face; and
    an optical condenser comprising a taper rod with a first end for receiving light and a second end connecting said light inputting face, wherein said first end has a cross sectional area larger than that of said second end.

2. The optically integrated device according to claim 1, said optical condenser is a lens assembly.

3. The optically integrated device according to claim 1, wherein said optical integrator is a hexahedron.

4. The optically integrated device according to claim 1, wherein said light inputting face comprises a translucent part and a reflector, and when the light enters said optical integrator through said translucent part, said reflector reflects the light entered said optical integrator.

5. The optically integrated device according to claim 4, wherein said translucent part is circular.

6. The optically integrated device according to claim 1, wherein said light inputting face is a face with a hole, and when the light enters said optical integrator through said hole, said face reflects the light entered said optical integrator.

7. The optically integrated device according to claim 1, further comprising a color filter attached on said light outputting face.

8. The optically integrated device according to claim 7, wherein said color filter comprises multiple colors.

9. The optically integrated device according to claim 8, wherein said color filter is a color selective panel adhered on said light outputting face.

10. The optically integrated device according to claim 7, wherein the forming method of said color filter is selected from the group consisting of dyeing method, pigment dispersed method, printing method, electrodepositing method and inkjet printing technology, or composition of above all or either.

11. An optically integrated device, comprising:
    an optical integrator comprising a pillar having a light inputting face at one end and a reflective part distributing over said pillar's side surface;
    a color filter, fixed on said optical integrator, wherein said reflective part reflects the light inside said optical integrator and is positioned between said light inputting face and said color filter; and
    an optical condenser comprising a taper rod with a first end for receiving light and a second end connecting said light inputting face, wherein said first end has a cross sectional area larger than that of said second end.

12. The optically integrated device according to claim 11, wherein said light inputting face comprises a translucent part and a reflector, and when the light enters said optical integrator through said translucent part, said reflector reflects the light entered said optical integrator.

13. The optically integrated device according to claim 12, wherein said translucent part is circular.

14. The optically integrated device according to claim 11, wherein said light inputting face is a face with a hole, the light enters said optical integrator through said hole, said face reflects the light entered said optical integrator.

15. An image-processing device, comprising:
    a light source;
    an optically integrated device, comprising an optical condenser and an optical integrator;
    wherein said optical integrator includes a pillar having a light inputting face at one end, a color filter at other end and a reflective part distributing over said pillar's side surface, said optical condenser comprising a taper rod with a first end for receiving light and a second end connecting said light inputting face, and said reflective part being positioned between said light inputting face and said color filter, wherein said first end has a cross sectional area larger than that of said second end; and an image-forming system treating the light passed through said color filter to form an image, wherein said optically integrated device is positioned between said light source and said image-forming system, said light source positioned nearly said light inputting face, said image-forming system is positioned nearly said color filter.

16. The image-processing device according to claim 15, wherein said light inputting face comprises a translucent part and a reflector, and when the light enters said optical integrator through said translucent part, said reflector reflects the light entered said optical integrator.

17. The image-processing device according to claim 15, wherein said light inputting face is a face with a hole, and when the light enters said optical integrator through said hole, said face reflects the light entered said optical integrator.

* * * * *